United States Patent
Rivera et al.

(10) Patent No.: US 9,675,914 B2
(45) Date of Patent: Jun. 13, 2017

(54) BAGGED FILTER CARTRIDGE, SYSTEM AND METHODS

(75) Inventors: Paris Rivera, Sacramento, CA (US); Pete Florez, Greenbrae, CA (US); Richard Johnson, Charlotte, NC (US)

(73) Assignee: BHA Altair, LLC, Franklin, TN (US)

(*) Notice: Subject to any disclaimer, the term of this patent is extended or adjusted under 35 U.S.C. 154(b) by 951 days.

(21) Appl. No.: 12/424,934

(22) Filed: Apr. 16, 2009

(65) Prior Publication Data

US 2010/0264100 A1   Oct. 21, 2010

(51) Int. Cl.
*B01D 29/41* (2006.01)
*B01D 29/96* (2006.01)

(52) U.S. Cl.
CPC ........ B01D 29/41 (2013.01); *B01D 2201/307* (2013.01)

(58) Field of Classification Search
None
See application file for complete search history.

(56) References Cited

U.S. PATENT DOCUMENTS

| | | | | |
|---|---|---|---|---|
| 2,341,114 | A | * | 2/1944 | Novak ............................ 210/94 |
| 2,978,108 | A | | 4/1961 | Strassheim |
| 3,727,764 | A | * | 4/1973 | Ogden .......................... 210/232 |
| 3,765,536 | A | | 10/1973 | Rosenberg |
| 4,929,352 | A | * | 5/1990 | Wolf ............................ 210/232 |
| 6,537,337 | B2 | | 3/2003 | Mullins et al. |
| 6,540,913 | B1 | | 4/2003 | Guichaoua et al. |
| 2002/0162308 | A1 | | 11/2002 | Mullins et al. |
| 2004/0094467 | A1 | | 5/2004 | Diemer et al. |
| 2008/0308485 | A1 | | 12/2008 | Bagci et al. |

FOREIGN PATENT DOCUMENTS

| | | |
|---|---|---|
| CN | 1385231 A | 12/2002 |
| DE | 10 2007 004 114 B3 | 2/2008 |
| EP | 0 516 846 A1 | 12/1992 |
| EP | 0 537 521 A1 | 4/1993 |
| JP | 2004033974 A | 2/2004 |
| WO | WO 98/23356 A2 | 6/1998 |
| WO | WO 2005/061074 A1 | 7/2005 |
| WO | WO 2008/111825 A1 | 9/2008 |
| WO | WO 2009/132864 A1 | 11/2009 |
| WO | WO 2012/007222 A1 | 1/2012 |

OTHER PUBLICATIONS

Purolator™ filter sales brochure—filter with bag—Mar. 2009.*
Purolator™ filter sales brochure—filter with housing—Mar. 2009.*
(Continued)

*Primary Examiner* — Krishnan S Menon
(74) *Attorney, Agent, or Firm* — Reinhart Boerner Van Deuren P.C.

(57) ABSTRACT

A filter is provided comprising a filter media element enclosed by an impermeable bag with inlet and outlet ports provided for flow into and out of the bag and through the filter media element contained in the bag. The bag may be constructed of a sheet of plastic material of multiple layers. The filter element may be a stack of filter media disks for depth filtration and adsorption. The filter provides for cleanly change out, with unfiltered fluid being contained in the bag on the upstream side of the filter element within the bag.

33 Claims, 5 Drawing Sheets

(56) References Cited

OTHER PUBLICATIONS

Purolator Advanced Filtration; Depth-Clear™ Series; Precision Depth Filter Sheets for Critical Process Fluids; Product Brochure; dated Jan. 2004; 2 pages.
Purolator Advanced Filtration; Depth-Clear™ C Series; High Capacity Activated Carbon Filter Modules; Product Brochure; dated Jan. 2004; 2 pages.
Purolator Advanced Filtration; Dyna-Clear™ F; High Capacity Felt Liquid Filter Bags; Product Brochure; dated Nov. 2003; 2 pages.
Purolator Advanced Filtration; Dyna-Clear™ M; High Performance Mesh Filter Bags; Product Brochure; dated Nov. 2003; 2 pages.
Purolator Advanced Filtration; Depth-Clear™ P & LE Series; Depth Filter Modules for Biopharmaceutical Applications; Product Brochure; dated Jan. 2004; 2 pages.
Purolator Advanced Filtration; Depth-Clear™ S Series; Depth Filter Modules for Critical Process Fluids; Product Brochure; dated Jan. 2004; 2 pages.
Purolator Advanced Filtration; Depth-Clear™ SA & U Series; Depth Filter Modules for Critical Hydraulic Fluids; Product Brochure; dated Jan. 2004; 2 pages.

* cited by examiner

BAGGED FILTER CARTRIDGE, SYSTEM AND METHODS

FIELD OF THE INVENTION

The present invention generally relates to filter cartridges and more particularly relates to the enclosures and related connections for filter elements such as may be employed in industrial process filtration.

BACKGROUND OF THE INVENTION

There are numerous applications for industrial process filtration such as in the biotech, pharmaceutical, food and beverage industries, to name a few. In these industries, it is relatively common to employ combination adsorption and depth filter media such as the DEPTH-CLEAR series media provided by the present assignee, also referred to as Purolator Liquid Process one of the CLARCOR companies. In this type of media, particles are captured through a combination of mechanical capture due to pore size and as well as electro-kinetic adsorption. For example, cellulous media and/or synthetic materials and/or combinations thereof may be used to provide a substrate. Additionally, such material as activated carbon, clays and other materials may be supported or otherwise integrated into the disc to provide for electro-kinetic absorption.

For example, Purolator Liquid Process has a number of depth filter modules comprising stacked discs of depth filter sheets that provide for filter media elements including different series for different filtration applications (e.g. P, LE, C, SA, U, and S series). Each different series may be used for a different application. For example, the SA and U series may be used for removal of carbon particles and low levels of moisture that may result from the breakdown of dielectric oil; and therefore, can be used for filtration of a number of oils. Different grades and particle removal efficiencies may be obtained in such grades. Also, for example, the DEPTH-CLEAR S series of Purolator Liquid Process may be used for such applications as beer, wine, juices and cider, chemicals, resins, inks, varnishes and the like to remove particles, micro-organisms, colloids, and pyrogen from critical process streams. The DEPTH-CLEAR C series is a high capacity activated carbon filter module built of formed discs that also may be used in a number of different applications. Also, the DEPTH-CLEAR P and LE series are used in biotech applications such as for antibiotics, blood products, intravenous solutions, cough syrups and the like. These types of filter media elements may be employed in embodiments of the present invention.

Typically, the DEPTH-CLEAR elements and other competitive elements are installed in reusable stainless steel housings which provide for washing and cleaning ability. In such existing applications, there is considerable downtime associated with filter change out when these filter elements become spent. Specifically, change out requires isolating the housing by shutting off appropriate valves and then cleaning the housing after the filter element is removed by washing out the unfiltered filtrate contained within the housing.

Also known in the filtration industry are porous filtration bags such as the DynaClear F and DynaClear M Series of Purolator Advanced Filtration which contain filter media of a certain porosity to allow for high fluid flow at low pressure drops while having a significant contaminant holding capacity through barrier and/or depth filtration. While filter bags work adequate in some applications, it is difficult to obtain a significant surface area with filter bags. Hence, more compact filter elements such as using stacked discs as in the DEPTH-CLEAR series depth filter sheets and filter elements described above is often provided to provide for a compact assembly that provides for a high filtration capacity with substantial surface area and flow capacity.

The present invention is directed toward improvements over the state of the art.

BRIEF SUMMARY OF THE INVENTION

The present invention employs a bag in combination with a filter media element which can provide for several different advantages.

According to one aspect, a filter (e.g. a filter cartridge) comprises a bag that is adapted to receive fluid through an inlet port and adapted to return fluid through an outlet port. A fluid flow path runs inside the bag from the inlet port to the outlet port. A filter media element is contained in the bag with the fluid flow path running through the filter media element.

In an embodiment, the bag can be filtrate impermeable but includes openings to provide for the inlet and outlet ports. In such an embodiment, the bag provides a housing for trapping unfiltered fluid on the upstream side of the filter element and the bag. This can provide for a clean change out of the filter element at the end of its useful life as unfiltered fluid is contained in the bag, separated from filtered fluid (also known as "filtrate").

In another aspect of this invention, a vacuum applied to the bag containing trapped unfiltered fluid will allow a near complete evacuation of the unfiltered fluid through the filter media by the bag conforming to the filter element minimizing "hold-up volume." This feature is particularly beneficial to the bio-pharmaceutical industry because the costs of the filtrate can be thousands of dollars per ounce. As such, a method may further comprise suctioning fluid from the bag to recapture fluid; and replacing the bag and the filter element. The suctioning may be done on the inlet or outlet side. When suctioning is done to filtrate on a filtered side of the filter element, some or much of the unfiltered fluid may be forced through the filter element. Suctioning may alternatively or additional be done to the unfiltered side to suction unfiltered fluid though an inlet in the bag.

Other inventive aspects of the present invention may include the provision for inlet and outlet fittings that are sealingly connected to the bag. For example, an inlet fitting can provide the inlet port and can be secured directly to an inlet opening in the bag with the bag being connectively sealed to the inlet fitting. The inlet port extends through the inlet opening into an interior of the bag. Similarly, the bag may include an outlet opening to provide for the outlet port. The outlet opening may be surrounded by an annular disc that is sealingly connected to the bag. An outlet fitting can be connected with the filtered fluid chamber and extending through the annular disc which provides for the outlet opening in the bag. The annular disc at the outlet end of the bag may be fixed relative to and in sealing engagement with the outlet fitting. In contrast, the inlet fitting may be carried freely by the bag in space relation and free of the filter media element such that it is movable relative thereto. The outlet fitting may be integrally provided by a support core that extends through a central axially extending cavity formed inside the filter media element. For example the filter media element may comprise a plurality of stacked filter media discs such as the filter media elements described in the background.

Further, the invention may include a filter support housing in combination which includes a base, a generally cylindrical sidewall extending from the base to provide a filter chamber to receive the filter with an open end. A cover is removably mounted over the open end of the support housing. The filter support housing is adapted to support the bag. The cover has an entrance port to accommodate the inlet port to the filter element and the base of the filter support housing may have an exit port therein to accommodate the outlet port of the filter. Other configurations a housing with top feed top discharge, top feed bottom discharge, bottom feed bottom discharge, bottom feed and bottom discharge. This housing will have the option to pivot allowing the greatest amount of evacuation of the vessel either through vacuum or gravity.

Another aspect of the present invention may be directed toward a filter with a unique pre-load compression arrangement of multiple filter discs in a stacked disc filter media embodiment. Such a filter may include a support core assembly having opposed axial ends that includes first and second compression load members secured to opposing axial ends of a support core. An annular filter media element is provided that includes a plurality of filter discs arranged in a stack on the support core. A plurality of sealing rings are proximate in inner periphery of the filter discs in surrounding relation of the support core. At least one of the compression load members of the support core assembly is movable axially relative to the other. The load elements apply a pre-set axial compression force to the sealing rings. As a result, the pre-set axial compression force may be done at the factory as opposed to the location of and use of the filter element.

One of the load members is a threaded load member that threadingly engages corresponding threads on one end of the support core. As a result, screwing rotation of the load member incrementally moves the threaded load member axially relative to the other load member. As opposed to threading, ultrasonic, hot plate, infrared, or spin welding of the load member may be employed. The other load member may be integrally formed or otherwise integrally joined and thereby permanently secured to the support core.

Yet a further aspect of the present invention is a method of filtering fluid comprising inletting unfiltered fluid into a bag, flowing the unfiltered fluid through a filter media element thereby creating filtered fluid, and outletting the filtered fluid. Preferably, the method may further comprise completely encasing the filter media element within the bag wherein an inlet fitting is sealingly attached to the bag for inletting filtered fluid and an outlet fitting is sealingly attached to the bag for outletting filtered fluid.

The method may further comprise installing the bag and the filter media element into a housing and connecting the inlet and outlet fittings to inlet and outlet conduits respectively. Fluid pressure in the bag can be supported by the housing when in use. At maintenance/service intervals when the existing filter is spent, the method may include replacing the bag and the filter media element by disconnecting the inlet and outlet fitting and removing the bag from the housing with unfiltered fluid still remaining in the bag. As a result, this can provide for cleanly removal from the housing. Then a new filter comprising another bag and casing a filter media element can be connected by reconnecting the inlet and outlet fittings thereof to inlet and outlet conduits respectively.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring to the Figures, an embodiment of the present invention has been illustrated as a filter in the form of a filter cartridge 10, that includes an enclosure in the form of a bag 12 that encloses a filter element 14 (also referred to as filter media element). The filter element 14 includes suitable filter media 15 that provides barrier/surface loading filtration, depth filtration, adsorption filtration, and/or combinations thereof. The filter cartridge 10 can be installed in a support housing assembly 16, and thereby provides for a filter assembly (e.g. a combination of the filter and the support housing assembly).

Before turning to the details of filter cartridge 10, details will be provided about the support housing assembly 16. The support housing assembly 16 may include a support housing 18 and a cover 20 that closes the open end 22 of the support housing 18. As illustrated, the support housing is generally a bowl-like member to include a disc-like base 24 and an annular and axially extending cylindrical side wall 26 extending vertically upward from the base 24 to define the open end 22. The open end 22 is sized large enough such that it is adapted to receive the filter cartridge 10 through the open end. Fastener knobs 28 may be provided to releaseably secure the cover 20 to the support housing 18. The fastener knobs can be manually screwed to manually secure or release the cover from the support housing.

As illustrated, the cover 20, and base 24 may include respective and diametrically opposed entrance and exit ports 30, 32 to accommodate fluid flow into and out of the filter cartridge 10. The support housing and cover may comprise stainless steel material or other rigid material such as rolled sheet metal or molded plastics that adequately provides support to the bag 12 of the filter cartridge 10 when it is filled with fluid, such as liquid. Thus, the support housing 18 generally carries the weight of the filter cartridge including the liquid contained therein and also supports the bag 12 against fluid pressure that is exerted in the filter cartridge 10; and in part, due to the resistance provided by the filter element 14. To accommodate the filter cartridge 10 and to allow for expansion 12 of the bag, vent openings may optionally be provided that are adapted to vent air from inside the housing when the bag receives unfiltered fluid that causes the bag to expand and thereby conform substantially to an interior of the housing. This reduces air pockets and/or the size of such air pockets when the filter cartridge 10 is employed in use within the support housing assembly 16.

Figure 3:
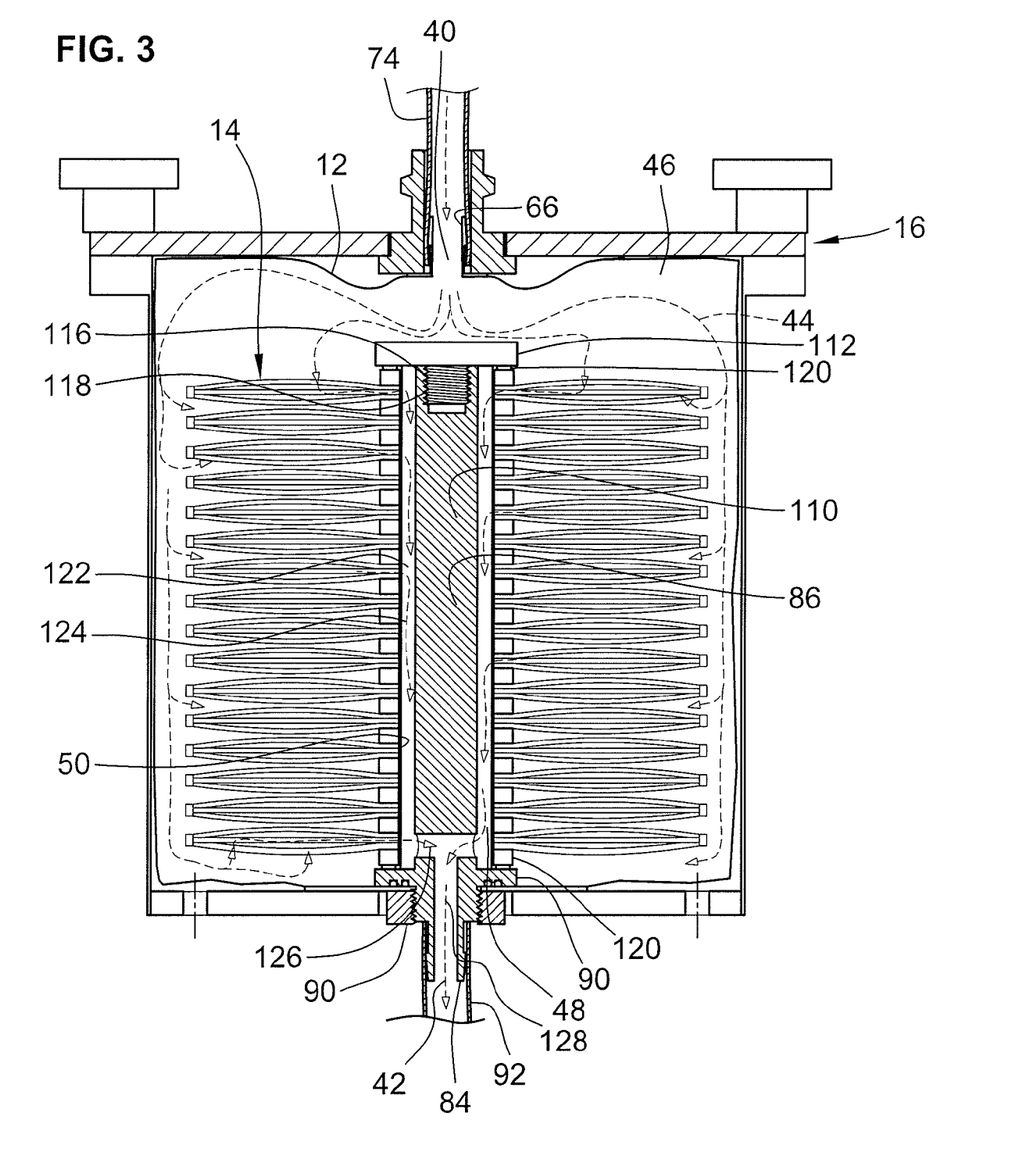
FIG. 3 is a cross section of the filter assembly shown in previous figures in an assembled state with fluid flow paths indicated.
Figure 4:
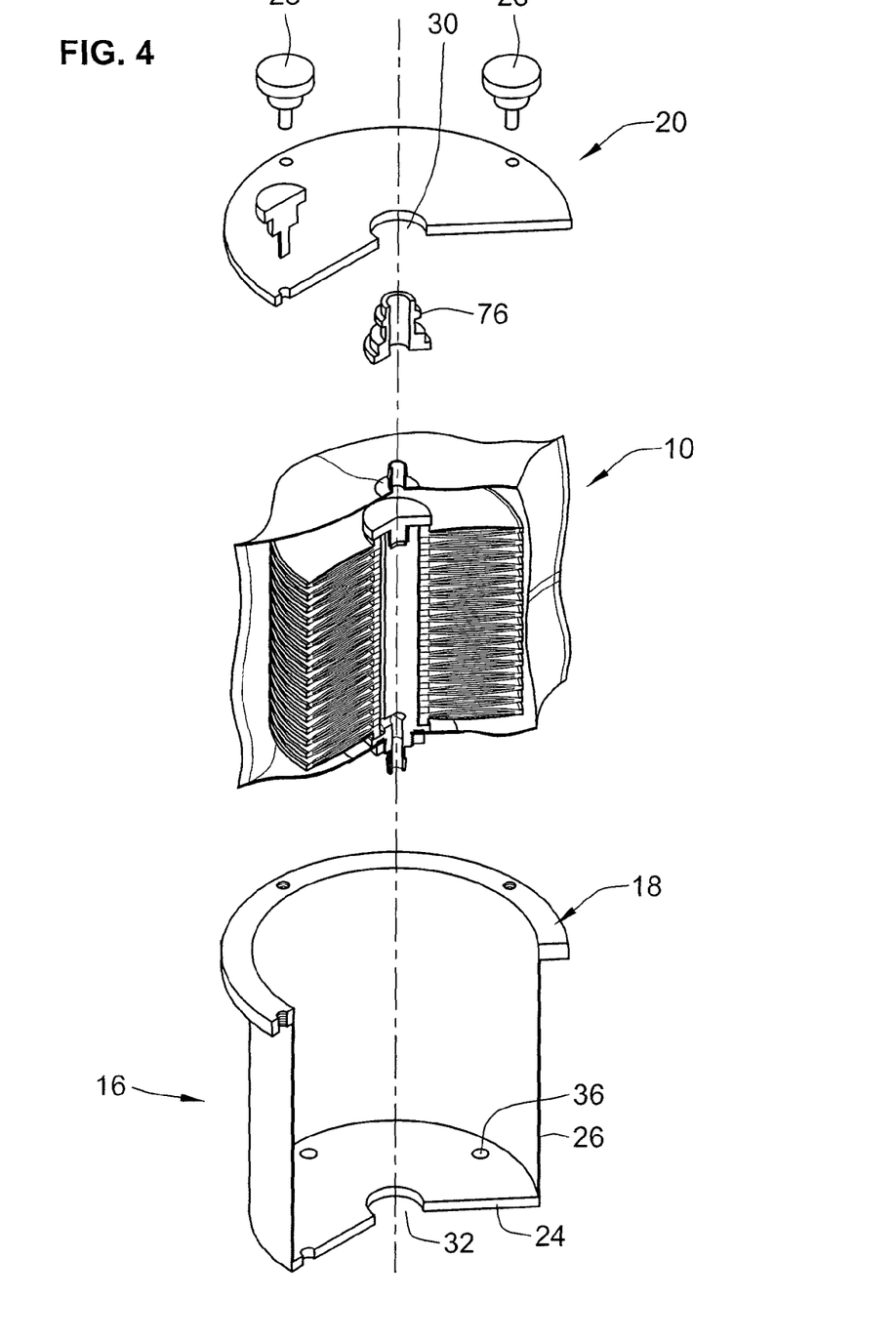
FIG. 4 is a partial cutaway cross-sectional isometric view of the assembled filter to illustrate how it is installed within a support housing in which the support housing is shown in exploded view.
Figure 5:
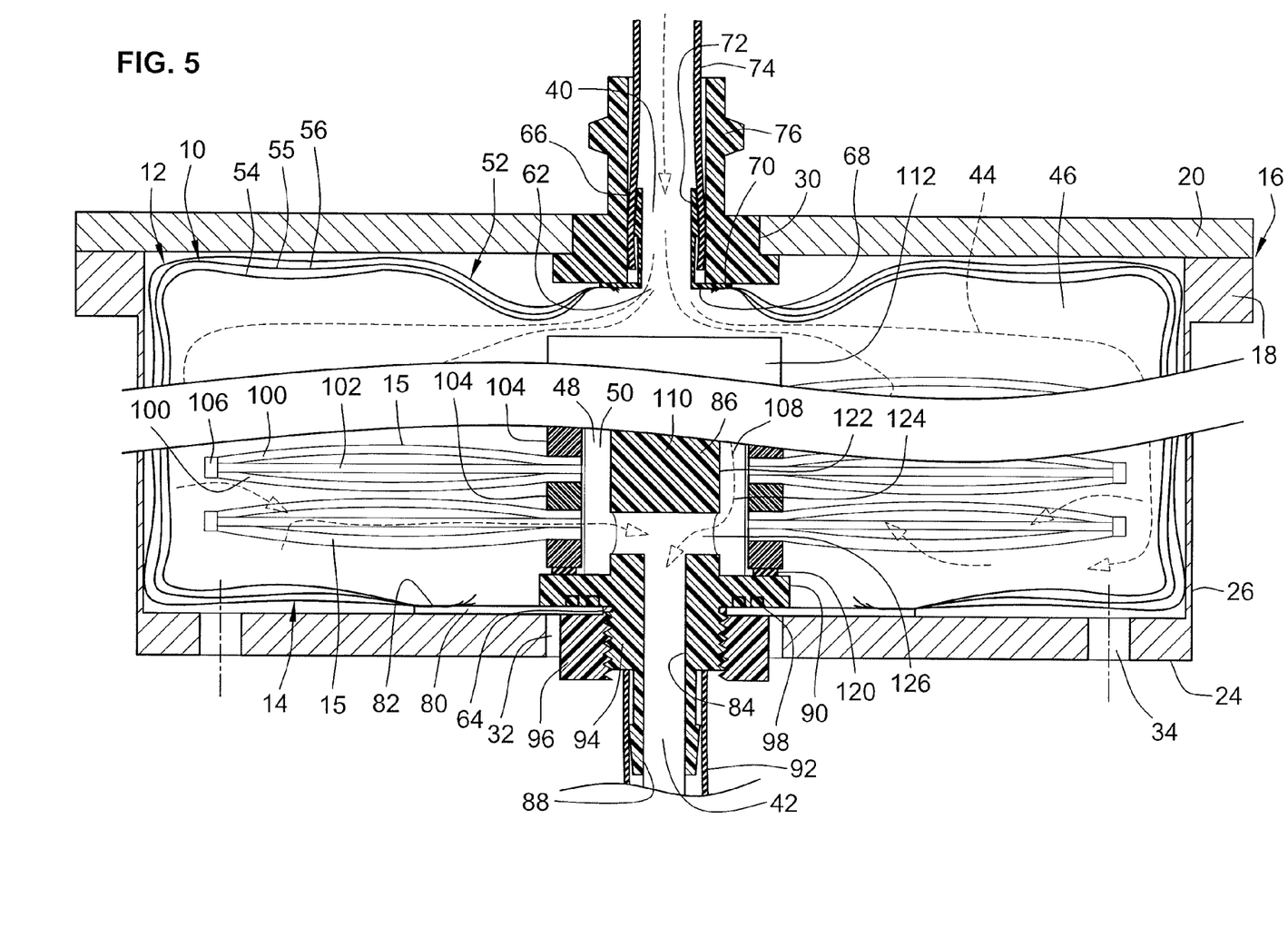
FIG. 5 is an enlarged view of the opposed ends of the filter assembly shown in FIG. 3 to better illustrate how the inlet fittings are attached to the bag and show that the bag may contain multiple layers as illustrated.

Turning in greater detail to the filter cartridge as illustrated in FIGS. 3 and 5, it is seen that the bag 12 acts as an enclosure to fully enclose the filter element 14. The bag 12 is adapted to receive fluid through an inlet port 40 and adapted to return fluid through an outlet port 42. The fluid flow path schematically indicated in FIG. 3 at 44 is indicated to run inside the bag from the inlet port to the outlet port and passes through the filter element 14. This provides for an unfiltered fluid chamber 46 for unfiltered fluid between the bag and the filter element that is in fluid communication with the inlet port 40. In the case of an annular filter element 14 as illustrated, the unfiltered fluid chamber 46 generally surrounds the outside of the filter element 14 both at opposed ends and the annular space between the bag 12 and the filter element 14.

A filtered fluid chamber 48 is formed by the filter element with the filter element interposed between the unfiltered fluid chamber 46 and the filtered fluid chamber 48 such that fluid flowing along the fluid flow path 44 passes through the filter media 15 of the filter element for removal of contaminants. The outlet port is in fluid communication with the filtered fluid chamber 48 which in this case is formed by a central internal cavity 50 formed within the filter element 14.

In a preferred embodiment, the bag 12 is impermeable to the fluid being filtered and thereby provides a flexible housing for trapping unfiltered fluid on the upstream side between the filter element and the bag in the unfiltered fluid chamber 46.

As shown, the bag 12 is preferably impermeable and nonporous to the fluid which is being filtered, typically a liquid in preferred embodiments. The bag can be formed from a single sheet 52 of impermeable and flexible plastic material, that may comprise one or more layers and as shown in FIG. 5 that in an embodiment may include a total of three layers 54, 55, 56. The different layers 54, 55, 56 may be provided for a variety of reasons. While one layer may be sufficient in some applications preferably at least two layers and in some applications three layers are provided. In the illustrated embodiment shown in FIG. 5, a contact barrier layer 54 prevents liquid from escaping from within the bag, a gas impermeable layer 55 prevents the migration of air or other gas inside the bag which can prevent oxidation of the liquid being filtered, and a structural support layer 56 (that may or may not be impermeable) is provided to maintain the structural integrity of the bag such as when the bag is removed while full of liquid from the support housing assembly 16. As such, the structural support layer 56 preferably forms the outermost layer of the plastic sheet 52 which forms the bag.

The bag 12 can be made by folding the plastic sheet 52 to provide for the enclosure structure. Specifically, the sides of the plastic sheet 52 can be seamed together along vertical seams 58 which may be provided by welding the plastic material together which sealingly connects and prevents passage of fluid along the vertical seams 58. Similarly, the opposed edges or ends of the plastic sheet 52 may be joined via a plastic weld along a horizontal seam 60 that sealingly connects the opposed edges of the plastic sheet 52. In this manner, a fluid impermeable enclosure is provided that acts as a flexible housing that can conform in substantial shape to the support housing 18 in which it is eventually situated.

Figure 1:
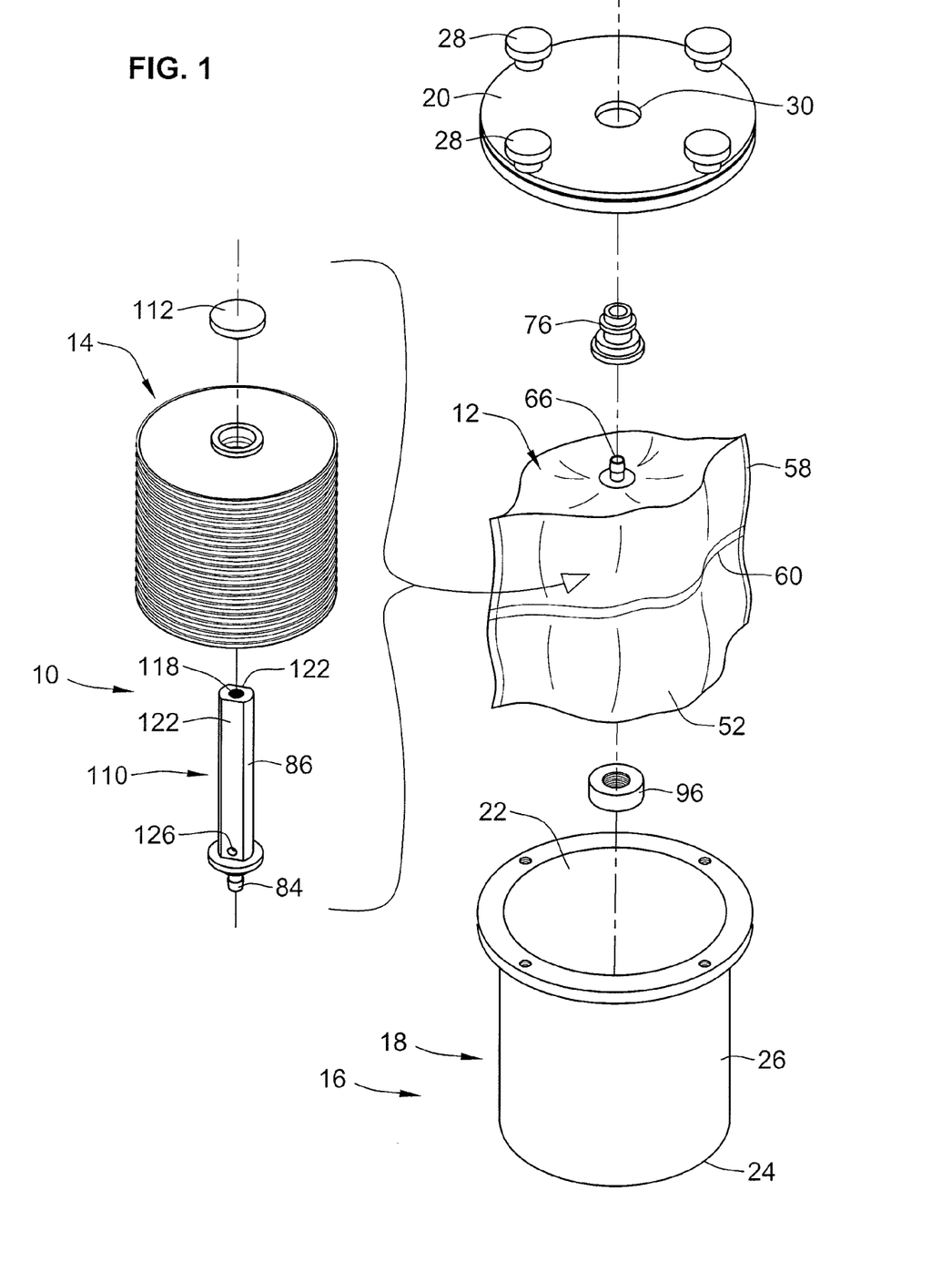
FIG. 1 is an exploded isometric view of the components of a filter assembly including a filter in combination with a filter support housing, in accordance with an embodiment of the present invention.
Figure 2:
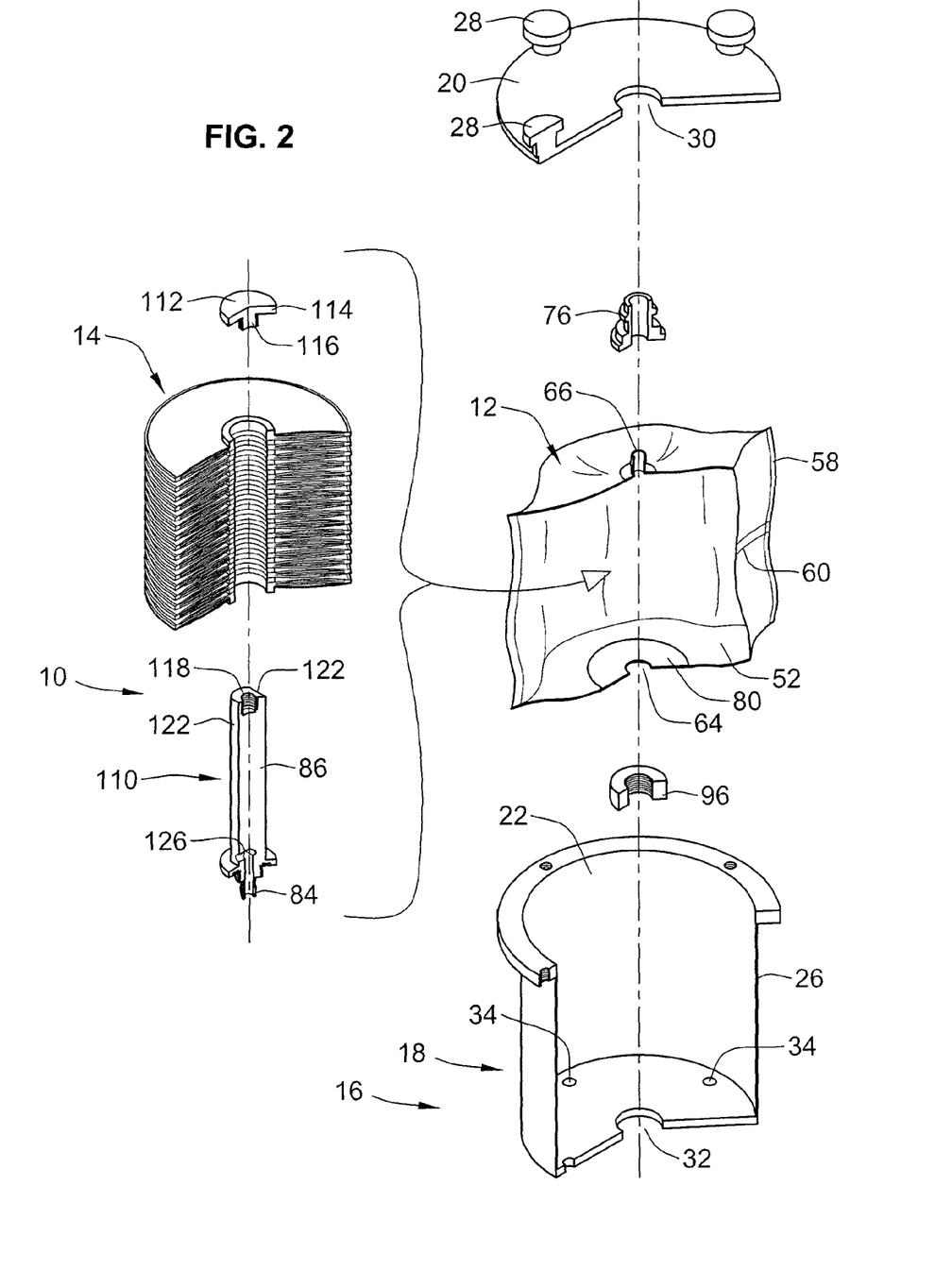
FIG. 2 is a similar exploded view to that of FIG. 1 except showing a partial cutaway cross-sectional view of the components.

With continued reference to FIGS. 3 and 5, to provide for fluid flow into and out of the bag 12, the bag includes inlet and outlet openings 62, 64 (see also e.g. FIG. 2 for outlet opening 64) at opposed top and bottom ends of the bag, respectively. The inlet port 40 extends through the inlet opening 62 and the outlet port 42 similarly extends through the outlet opening 44 to provide for fluid communication along the fluid flow path 44.

An inlet fitting 66 provides for the inlet port 40. As shown, the inlet fitting 66 is connectively sealed to the bag 12 around the inlet opening 62 of the bag. In one embodiment, the inlet fitting may comprise a molded plastic member that integrally provides an annular disc 68 that is plastically welded and sealed to the bag along an annular weld ring 70. A tubular hose barb projection 72 projects from the annular disc 68. The hose barb projection 72 includes a hose barb which provides for attachment to an inlet hose 74. It will be appreciated that the fitting may alternatively be other structures such as a screw thread, fluid coupling or other surface that is adapted to mate with an upstream conduit (including simply a smooth surface). A reusable inlet coupler 76 may be provided with the support housing assembly 16 for purposes of ensuring a sealing connection between the inlet conduit or hose 74 and the inlet fitting 66, when in use.

At the outlet end of the bag, a plastic annular disc 80 is integrally joined to the bag in surrounding relation of the outlet opening 64. The annular disc 80 may be joined in a sealing manner to the bag 12 by one and preferably at least two annular plastic weld rings 82 in which the plastic material of the annular disc 80 and the bag are joined and bonded together. The inner periphery of the annular disc 80 provides a substantial flange region for sealing engagement. To provide for the outlet port 42, an outlet fitting 84 is provided. The outlet fitting in the illustrated embodiment may be connected or integrally provided with a support core 86 that extends up into the filter element 14. The outlet fitting 84, in any event, is fluidically connected to the filtered fluid chamber 48 so as to drain filtrate that has passed through the filter element 14. In this embodiment, the outlet fitting includes a tubular hose barb projection 88 that integrally extends from an annular support flange 90. As in the case of the inlet fitting, the hose barb projection 88 provides a hose barb (or other suitable fitting structures such as threads, fluid coupling, smooth surface, etc.) that connects with an outlet conduit such as an outlet hose 92 to thereby outlet filtered fluid from the filter cartridge 12.

Between the barb fitting and the annular flange is interposed a threaded section 94 that threadingly receives a nut 96. The nut 96 can be screwed onto the outlet fitting 84 and thereby squeeze and compress the annular disc 80 of the bag and thereby provide for an axial compression seal at that location. Preferably, the support flange 90 provides for seal members such as integrally projecting annular ribs or otherwise gaskets 98 that provide for seals along the inner periphery of the bag and prevent for seepage of fluid along this location. By having a projecting structure such as integral plastic rib and/or gasket, the compression can be directed to those locations and thereby provide for axial compression sealing. The nut 96 may alternatively be joined in any other manner such as ultrasonic plastic welding, adhesively bonded or otherwise permanently secured to the outlet fitting 84 such that threading is not necessarily required. Further, a permanent connection of the nut 96 can prevent the nut 96 from backing off during use.

Turning in greater detail to the filter element, it should be noted that any type of filter element may potentially be used to include radial flow elements, axial flow elements, or other such elements depending upon the application. One preferred and particularly useful form in terms of an embodiment of the present invention is an annular filter element as illustrated that defines and provides for a central internal cavity 50 in which the filter media 15 separates the filtered side from the unfiltered side. One end of the annular filter media element may be closed (either integrally or by a separate member) while the other end can be open to provide for a regular predetermined flow path from the outside to the inside according to an embodiment and flow path illustrated, for example, in FIG. 3.

For example, the filter media element may include a plurality of filter discs 100 each containing sheets of filter media 15 such as a combination of adsorption and depth loading filtration media or doing a combination of filtration including particulate filtration as well as adsorption of undesirable molecules on a microscopic level. For example, the filter discs may be any of the DEPTH-CLEAR series filter media discs, that are commercially available from the present assignee, Purolator Liquid Process. In such a filter element arrangement, the filter discs 100 are stacked in a stack with adjacent filter discs being separated by spacer webs (also known as center separators) 102 and also along the inner periphery by rigid plastic sealing spacer rings 104. The outside of the filter discs 100 may be joined by seal rings 106. Between adjacent filter discs 100 and around the spacer webs (center separators) 102 are provided flow passages that drain filtered fluid into the open central internal cavity 50 defined within the filter element 14.

The stack of filter discs 100 may be retained together by retainer clips (not shown) that are provided along the inner periphery of the filter discs that hold the multiple filter discs together in the stack. Additionally, a support core assembly 110 is provided to secure and support the filter element 14 within the bag 12. As shown, the support core assembly 110 secures the filter element 14 to the outlet end of the bag, whereas the inlet fitting 66 is freely carried by the bag 12 and freely movable relative to the filter element through the flexibility afforded by the bag 12. As a result, this provides for easy installation of the inlet fitting as the relative inlet and outlet fittings can be moved relative to each other (with the outlet fitting 84 being fixed via the support core 86 to the filter element 14) and the inlet fitting 66 being freely movable through the flexibility of the plastic material of the bag 12.

The support core assembly generally includes several different portions including the support core 86, which may integrally provide for the outlet fitting 84 (either as a unitary one piece structure or alternatively two structures which are joined permanently or non-permanently together). Additionally, the support core assembly includes a compression load member 112 that acts on the end opposite the support flange 90. The support flange 90 thereby provides an opposing compression load member to that of compression load member 112. The compression load member 112 is movable axially relative to the support flange 90 and can be secured to apply a preset axial compression force to the sealing rings 104 along the inner periphery of the filter discs 100. The compression load member 112 also thereby firmly secures the filter element axially relative to the support core 86. The compression load member can then be joined to the support core 86 such as by way of a threaded attachment; or alternatively, away by means of welding such as infrared or ultrasonic welding done while a preset axial load is applied to the stack of filter discs.

In the present embodiment, the compression load member is shown to have a threaded connection such that screwing rotation of the compression load member 112 incrementally moves the threaded load member relative to the support flange to apply a preset axial compression force limited dimensionally by the support core (tightening to a predetermined position). In one embodiment, the compression load member 112 may include a flange 114 that engages the end sealing ring and thereby closes off the upper end of the filter element and a threaded stem 116 that is received into a threaded opening 118 formed at the axial end of the support core. Preferably, flange 114 and support flange 90 each include an integral axially projecting annular rib 120 that concentrates the force and provides an annular sealing contact against the end sealing rings 104 thereby preventing fluid leakage around the ends.

The support core 86 is substantially solid but does include a non-circular periphery with at least one and preferably multiple recessed regions such as flats 122 along the periphery. The flats 122 in combination with the inner circular periphery of the internal cavity 50 of the filter element provides flow channels 124 to facilitate flow of filtered fluid toward the outlet port 42. Radial passages 126 toward the bottom end connect the flow channels 124 to a central axial passage that extends through the support flange and forms the outlet port 42.

With this arrangement, the filter cartridge 110 provides for a method for filtering fluid which includes inletting unfiltered fluid into the bag 12 through the inlet port 40. The unfiltered fluid can then flow through the filter media element 14 whereby it is filtered creating filtered fluid. Then the filtered fluid can then be outlet through the outlet port 42. The filter cartridge also completely encases the filter media element 14 within the bag 12 with the inlet fitting sealingly attached to the bag for inletting filtered fluid and the outlet fitting sealingly attached to the bag for outletting filtered fluid.

The present embodiment also provides for a clean change out that does not require cleaning of the surrounding support housing assembly 16. For example, replacement is made easy in that while the inlet and outlet conduits are shut off (e.g. via valves not shown), the filter cartridge 10 can be changed by disconnecting the inlet and outlet fittings and removing the filter cartridge with unfiltered fluid still remaining in the bag. Thereafter, a new filter cartridge comprising a new bag and encasing a new filter media element along with new inlet and outlet fittings can be provided and reconnected to the inlet and outlet conduits. A further advantage is that the core also can provide for structure for pre-compressing the stack of filter discs 100 when in the bag when that type of a filter media element is chosen. Further, the present invention can also be used with existing systems that employ stainless steel support housing with few modifications and thus not only act as a retrofit to providing cleanly replacement for existing applications, but also provide for applications and new systems as well.

An advantage of the present embodiment is that it isolates leaks from the filtrate. If there were a leak in the bag or between the core and the bag, the filtered fluid (filtrate) is isolated in the outlet port and the unfiltered fluid would not contaminate the filtrate. Instead the unfiltered fluid could spill onto the floor through the central exit opening in the support housing.

Various other advantages and features may be provided. For new applications, the support housing assembly can be made of less expensive materials such as using flat and rolled sheet metal for its constructions. Due to the bag enclosure of the filter, there are no sealing requirements and therefore no o-rings or valves that can fail. Further, the housings may be stackable and stacked on top of each other for expansion.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter, comprising:
   a bag defining an interior, the interior adapted to receive fluid through an inlet port and adapted to return fluid through an outlet port, a fluid flow path running inside the bag from the inlet port to the outlet port, the bag being expandable and flexible; and
   a filter media element contained in the interior of the bag with the fluid flow path running through the filter media element;
   the filter media element comprising a plurality of filter discs arranged in an annular stack and defining an axially extending cavity, a first end of the cavity being open and connected to the outlet port and a second end opposite said first end, the second end being closed at a location inside the bag, a fitting or disc formed separately from the bag and welded to the bag to integrally secure and seal the fitting or disc to the bag, the fitting or disc providing fluid communicated through the bag to the interior.

2. The filter of claim 1, wherein the bag comprises at least two bag layers.

3. The filter of claim 1, wherein the bag comprises three layers, including a contact barrier layer, a gas impermeable layer and a structural support layer.

4. A filter, comprising:
   a bag defining an interior, the interior adapted to receive fluid through an inlet port and adapted to return fluid through an outlet port, a fluid flow path running inside the bag from the inlet port to the outlet port, the bag being expandable and flexible;
   a filter media element contained in the interior of the bag with the fluid flow path running through the filter media element;
   an unfiltered fluid chamber for unfiltered fluid between the bag and the filter media element in fluid communication with the inlet port;
   a filtered fluid chamber for filtered fluid, the filter media element interposed between the unfiltered fluid chamber and the filtered fluid chamber, the outlet port in fluid communication with the filtered fluid chamber; and
   wherein the bag is filtrate impermeable and provides a housing for trapping unfiltered fluid on an upstream side between the filter media element and the bag;
   wherein the filter media element is an annular filter media element defining an internal cavity providing the filtered fluid chamber for filtered fluid, one end of the internal cavity being closed inside of the bag to separate the unfiltered fluid chamber and the filtered fluid chamber and the other end being open and connected to the outlet port; and
   a disc or fitting providing fluid communication with an interior of the bag, the disc or fitting being integrally secured and sealed to the bag.

5. The filter of claim 4, wherein the disc or fitting includes:
   an inlet fitting providing the inlet port, the bag having an inlet opening and being connectively sealed to the inlet fitting, the inlet port extending through said inlet opening into the interior of the bag, a closure closing said one end of the internal cavity.

6. The filter of claim 5, further comprising:
   an outlet opening in the bag for the outlet port, the outlet opening being surrounding by an annular disc that is sealingly connected to the bag, the inlet opening and the outlet opening being defined by the bag at separate, spaced apart locations.

7. The filter of claim 6, further comprising an outlet fitting connected with the filtered fluid chamber and extending through the annular disc, and wherein the annular disc is fixed relative to and in sealing engagement with the outlet fitting, and wherein the inlet fitting is carried freely by the bag in spaced relation and thereby freely movable relative to the filter media element.

8. The filter of claim 7, wherein the bag, the inlet fitting and the annular disc comprises plastic material, the bag being plastically welded to each of the inlet fittings at at least one weld ring and the annular disc at at least one weld ring.

9. The filter of claim 8, wherein the outlet fitting comprises a hose barb projection integrally extending from a support flange, the hose barb projection including a barb fitting adapted for connection to a hose and threading around the hose barb projection between the barb fitting and the support flange, further comprising a nut threaded onto the threading and sandwiching the annular disc therebetween with an annular axial compression seal therebetween.

10. The filter of claim 5, wherein the inlet fitting comprises an annular disc and an inlet hose barb projection integrally extending from the annular disc, the hose barb projection including a barb fitting adapted for connection to a hose, the annular disc being plastically welded to the bag at the inlet opening at at least one weld ring.

11. The filter of claim 4, further comprising a support core arranged in the internal cavity, the filter media element being an annular filter media element arranged surrounding the support core, wherein an inner perimeter of the annular filter media is larger than the support core, and wherein the support core has one end secured to the bag proximate the outlet port.

12. The filter of claim 4, wherein the annular filter media element includes a plurality of filter discs, the filter discs being stacked and compressed between the opposed ends, each of the filter discs including a combination of adsorption and depth loading filtration media.

13. The filter of claim 12, further comprising resilient spacer rings between adjacent filter discs spacing adjacent filter discs axially relative to each other, and wherein the support core threadingly engages a load element at the closed end, further including an outlet fitting integrally extending from the support core at the open end, the filter discs and plastic spacer rings being compressed axially between the load element and outlet fitting.

14. The filter of claim 13, wherein the load element is screwed into engagement with the support core a predetermined amount to provide a preset compression of the filter discs and plastic spacer rings.

15. The filter of claim 1, wherein the bag is constructed from a flat sheet of plastic that is folded with edges of the flat sheets being plastically welded together along seams to form an enclosure for the filter media element.

16. A filter assembly comprising: the filter of claim 1, and further comprising a support housing in combination therewith, wherein the filter is installed in the support housing, the support housing including a base, a generally cylindrical sidewall extending from the base to provide a filter chamber to receive said filter with an open end and a cover removably mounted over the open end, the filter housing supporting the bag against fluid pressure and fluid load in the bag, the cover having an entrance port and the base having an exit port therein to accommodate the inlet port and the outlet port.

17. The filter assembly of claim 16, further comprising vent openings in the housing to allow for expansion of the bag and to vent air from inside the housing when the bag receives unfiltered fluid in use that causes the bag to expand and conform substantially to an interior of the housing.

18. The filter of claim 1, further comprising:
a support core assembly having opposed axial ends, the support core assembly including first and second compression load members secured to opposing axial ends of a support core;
wherein the filter media element is an annular filter media element including a plurality of filter discs arranged in a stack on the support core in surrounding relation of the support core, and a plurality of sealing rings proximate an inner periphery of the filter discs and surrounding the support core; and
at least one of the compression load members being movable axially relative to the other, wherein the load elements apply a preset axial compression force to the sealing rings.

19. A filter, comprising:
a support core assembly having opposed axial ends, the support core assembly including first and second compression load members secured to opposing axial ends of a support core;
an annular filter media element including a plurality of filter discs arranged in a stack on the support core in surrounding relation of the support core, and a plurality of sealing rings proximate an inner periphery of the filter discs and surrounding the support core; and
at least one of the compression load members being movable axially relative to the other, wherein the load elements apply a preset axial compression force to the sealing rings, the support core being in a state of tension to carry the preset axial compression force,
wherein the second load member is an outlet fitting having an outlet port, the outlet fitting being integrally attached and fixed to one of the axial ends of the support core, the outlet port in communication with a filtered fluid chamber defined within the annular filter media element to outlet filtered fluid, and
wherein an annular inner periphery of the annular filter media element defines a generally cylindrical internal cavity, the support core having a non circular periphery with at least one recessed region along the periphery to drain fluid along between the periphery of the support core and the annular inner periphery of the annular filter media element, the support core having an internal passage formed therein in fluid communication with the outlet port.

20. A filter, comprising:
a support core assembly having opposed axial ends, the support core assembly including first and second compression load members secured to opposing axial ends of a support core;
an annular filter media element including a plurality of filter discs arranged in a stack on the support core in surrounding relation of the support core, and a plurality of sealing rings proximate an inner periphery of the filter discs and surrounding the support core; and
at least one of the compression load members being movable axially relative to the other, wherein the load elements apply a preset axial compression force to the sealing rings, the support core being in a state of tension to carry the preset axial compression force, and
wherein one of the load members is an outlet fitting having an outlet port, the outlet fitting being integrally attached to one of the axial ends of the support core, the outlet port in communication with a filtered fluid chamber defined within the annular filter element to outlet filtered fluid, the other end of the support core being closed, and further comprising:
a bag containing the filter media element, the bag having an inlet opening and an outlet opening;
an inlet fitting sealingly connected to the inlet opening and spaced axially from the filter media element and support core such that the inlet fitting is freely movable relative to the filter element; and wherein
the outlet opening of the bag is sealingly connected to the outlet fitting.

21. The filter of claim 1, wherein the second end is above the first end such that during operation fluid flows downwardly out of the cavity toward the first open end and is prevented from flowing upwardly out of the cavity.

22. The filter of claim 1, wherein fluid in the cavity is prevented from flowing upwardly out of the axially extending cavity and upwardly out of the bag by a closure closing the second end of the cavity.

23. The filter of claim 1, wherein second end of the cavity is permanently closed by a plug, such that fluid cannot flow into or out of the filter media element through said second end.

24. The filter of claim 1, wherein the fitting or disc is carried by the bag that is freely movable relative to a top end of the filter media element.

25. The filter of claim 1, wherein no part of the filter media element extends outside the bag.

26. The filter of claim 4, wherein the one end of the internal cavity closed by a closure in contact with the annular filter media element.

27. The filter of claim 4, wherein the disc or fitting carried on the bag is freely movable relative to the filter media element contained in the interior.

28. The filter element of claim 4, wherein the closed end of the internal cavity is not attached to the bag.

29. The filter of claim 4, wherein the fitting is plastically welded to the bag.

30. The filter of claim 4, wherein the fitting is above the filter media element and wherein the bag defines the outlet port, with the outlet port located below the filter media element.

31. The filter of claim 1, wherein the bag defines a first hole and a second hole, each of the first hole and second hole being separately fitted with the fitting or disc.

32. The filter of claim 1, wherein the bag defines separate holes for the inlet port and the outlet port.

33. The filter of claim 4, wherein the bag defines a first hole and a second hole, the disc or fitting being integrally secured to at least one of the first and second holes.

* * * * *